United States Patent [19]

Niessen

[11] Patent Number: 5,042,965
[45] Date of Patent: Aug. 27, 1991

[54] PROPELLER SYNCHROPHASER CONTROL WITH TRAJECTORY LOGIC

[75] Inventor: Frank R. Niessen, Stafford Springs, Conn.

[73] Assignee: United Technologies Corporation, Hartford, Conn.

[21] Appl. No.: 367,285

[22] Filed: Jun. 16, 1989

[51] Int. Cl.⁵ .............................................. B64C 11/50
[52] U.S. Cl. .......................................... 416/34; 416/35
[58] Field of Search ............................ 416/33, 34, 35

[56] References Cited

U.S. PATENT DOCUMENTS

| | | | |
|---|---|---|---|
| 4,653,981 | 3/1987 | Harner et al. | 416/34 |
| 4,659,283 | 4/1987 | Niessen et al. | 416/34 |
| 4,900,226 | 2/1990 | Vries | 416/34 |

Primary Examiner—William E. Wayner
Attorney, Agent, or Firm—Ronald R. Snider

[57] ABSTRACT

An apparatus for controlling the phase of a slave propeller relative to that of a master propeller is shown and described. A logic means having a trajectory function, $F(\phi_E)$, which defines the region for phase holding, i.e. where the error correction signal, $\phi_{EC}$, equals phase error $\phi_E$. In the region of phase holding, normal control is achieved and there is no slipping of control from a first propeller blade to a second propeller blade.

5 Claims, 6 Drawing Sheets

5,042,965

PROPELLER SYNCHROPHASER CONTROL WITH TRAJECTORY LOGIC

TECHNICAL FIELD

This invention relates to multiple propeller driven aircraft, and particularly to a SYNCHROPHASER ® (a registered trademark of United Technologies Corporation) for synchronizing propeller blades device for controlling a slave propeller at the same speed and at a selected phase relation between itself and the master propeller.

BACKGROUND ART

It is known in the art to provide for phase and speed control of propellers on multiple engine aircraft as is shown in U.S. Pat. Nos. 4,659,283 and 4,653,981.

Propeller synchronizers have been used on multi-engine propeller driven aircraft to maintain a selected phase angle relationship between the master propeller and each of the designated slave propellers. Once the propellers are synchronized, the aircraft fuselage experiences minimum acoustic noise and vibration. The propeller synchronizer device provides a relative phase angle for a given slave propeller by changing the slave propeller speed.

In order to minimize noise in propeller driven aircraft, it is important to maintain a desired phase relationship among all aircraft propellers. This disclosure describes an improved method for controlling the phase relationship between two such propellers.

Present-day propeller synchronizers typically utilize an electrical pulse to detect the time that each propeller is at a particular blade position. For a given propeller, the time between successive pulses may be used to determine propeller speed. Using time as a measure of propeller blade position, the phase relation between any two propellers can be determined by the length of time between an electrical pulse from one propeller and that from the other propeller.

In the simplest implementation, the sensed phase $\Delta\phi$ between the slave propeller and the master propeller is derived by comparing one particular blade of the slave propeller versus one particular blade of the master propeller. FIG. 1 shows $\Delta\phi$ versus time for the case where the speed of the slave propeller ($N_{PS}$) exceeds the speed of the master propeller ($N_{PM}$) by 1 RPM. Note that 1 RPM is equivalent to 6 deg/sec and that the range of $\Delta\phi$ is ±180° for this case.

In a more sophisticated implementation, the sensed phase $\Delta\phi$ between the slave propeller and the master propeller could be derived by comparing any one of the blades of the slave propeller versus one particular blade of the master. The obvious advantage is that at any given time, the blade of the slave propeller which had its position nearest to that of the master, could be used to define $\Delta\phi$. If the number of blades per propeller were B, then the range of $\Delta\phi$ would be ±(180°). FIG. 2 shows $\Delta\phi$ versus time for a four-bladed propeller (B=4) where $N_{PS}-N_{PM}=1$ RPM. The range of $\Delta\phi$ for this example is ±45°.

It is also possible to select from a subset of blades which are equally spaced, to determine $\Delta\phi$. For a propeller with B blades, if L is a prime factor of B, then $$\pm\left(\frac{180°}{L}\right)$$

represents all possible ranges for $\Delta\phi$. For example, for a propeller with 6 blades (B=6), then L=1, 2, 3 or 6 and possible ranges for $\Delta\phi$ are ±180°, ±90°, ±60° and ±30°.

Phase error ($\phi_E$) is the angular difference between sensed phase $\Delta\phi$ and a reference phase difference ($\Delta\phi_{REF}$). $\Delta\phi_{REF}$ is the phase offset from perfect alignment of blades which is often necessary in providing the lowest noise synchronization of propellers. $\Delta\phi_{REF}$ is determined by the characteristics of the particular aircraft, propellers and engines.

Present propeller synchronizers typically utilize one electrical pulse per propeller revolution so that sensed phase provides a phase error measurement up to ±180° as described above. In addition, present propeller synchronizers some form of "start circuit" to assure that the master and slave propeller speeds are nearly the same and that the phase error is small so that the synchronizer control laws will avoid the condition where phase error has a numerical discontinuity. The description of the invention herein is based on the assumption that the range of $\Delta\phi$ is ±180°.

DISCLOSURE OF THE INVENTION

Objects of the present invention include provision of a propeller synchronizer, which synchronizes the phase of one or more slave propellers relative to a master propeller and which decreases the recovery time for synchronizing the phase of the propellers.

In accordance with the present invention a pair of trajectory functions define speed error limits between a master propeller and each slave propeller of an aircraft over a range of corresponding phase errors, to maintain a specified master/slave phase relationship by varying blade pitch which controls slave propeller speed.

An advantage of this invention is that it may be easily implemented with a single control integrator which, furthermore, eliminates output step transients.

Another important feature and advantage of this control is its very quick initialization and very quick recovery if the synchronized phase of the propellers is upset due to a large disturbance.

Another important feature and advantage of this control is that the control integrator, by integrating the speed difference signal, is effectively providing a proportional phase error control signal which completely avoids the numerical discontinuity associated with use of the phase error signal itself.

The foregoing and other objects, features and advantages of the present invention will become more apparent in the light of the following detailed description of the preferred embodiments thereof as illustrated in the accompanying drawings.

BEST MODE FOR CARRYING OUT THE INVENTION

Figure 1:
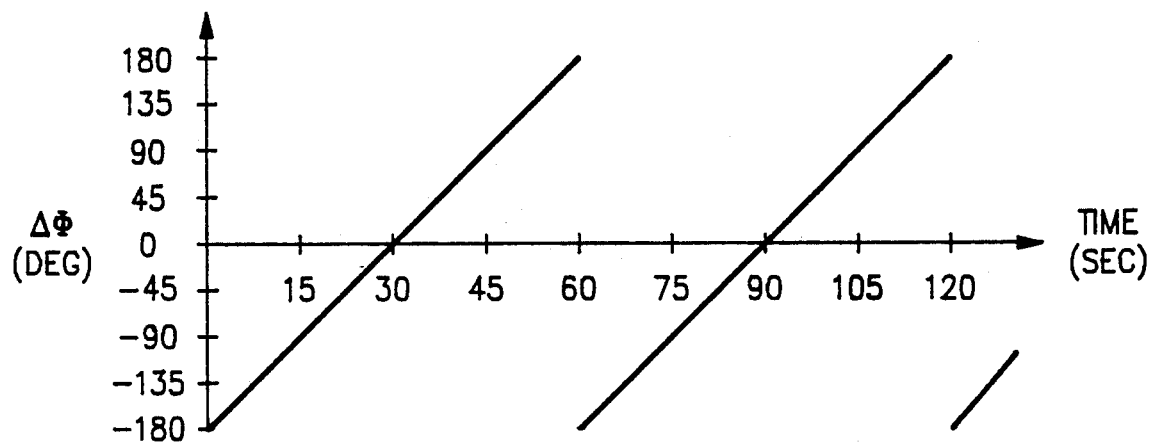
FIG. 1 shows $\Delta\phi$ versus time where the speed of the slave propeller exceeds the speed of the master by 1 RPM.
Figure 2:
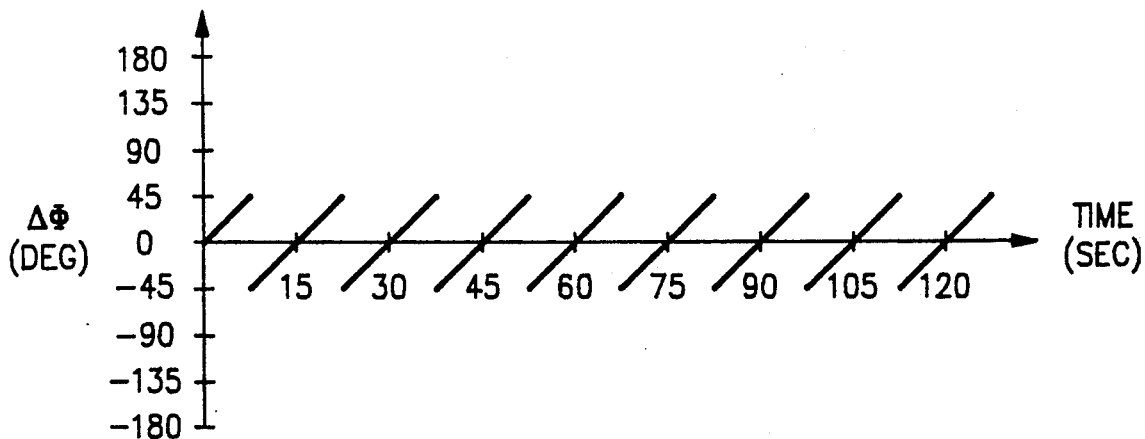
FIG. 2 shows $\Delta\phi$ versus time for a 4 bladed propeller.
Figure 3:
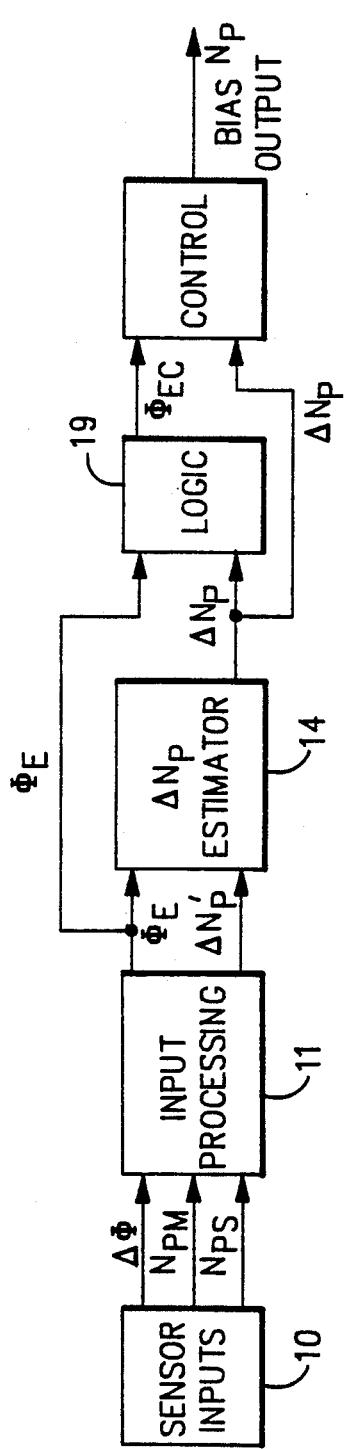
FIG. 3 shows the propeller synchronizer control in block diagram form.

FIG. 3 illustrates a schematic block diagram of a propeller synchronizer according to the present invention. The sensor inputs 10 provide for the speed of the master and slave propellers ($N_{PM}$ and $N_{PS}$) and the difference in phase measured between the propellers ($\Delta\phi$). The input processing section 11 converts the sensor inputs to phase error ($\phi_E$) and $\Delta N'_P$ ($\Delta N_P$ uncorrected).

Figure 4:
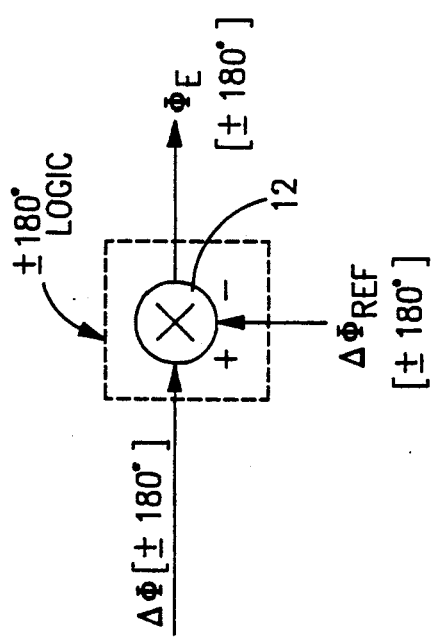
FIG. 4 shows the phase error portion of the input processing block of FIG. 3.

FIG. 4 shows the summing junction 12 which is used for calculating the phase error $\phi_E$ by comparing the phase angle difference ($\Delta\phi$) with the reference phase which is a selected constant ($\Delta\phi_{REF}$). As noted on FIG. 4, $\pm 180°$ logic must be applied in calculating $\phi_E$ which is the output of summing junction 12. $\phi_E$ represents a phase angle value and must be limited to the $\pm 180°$ range just like $\Delta\phi$ and $\Delta\phi_{REF}$. The algorithm for $\pm 180°$ logic is given here for $\phi_E$:

If $\phi_E > 180°$, then $\phi_E = \phi_E - 2(180°)$

If $\phi_E < -180°$, then $\phi_E = \phi_E + 2(180°)$

Figure 5:
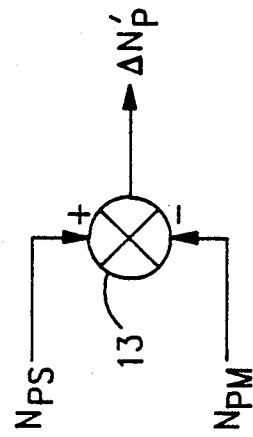
FIG. 5 shows the speed difference portion of the input processing block of FIG. 3.

FIG. 5 shows a summing junction 13 which has an output $\Delta N'_P$ which is the difference between the measured speed of the slave propeller $N_{PS}$ and that of the master propeller $N_{PM}$.

Figure 6:
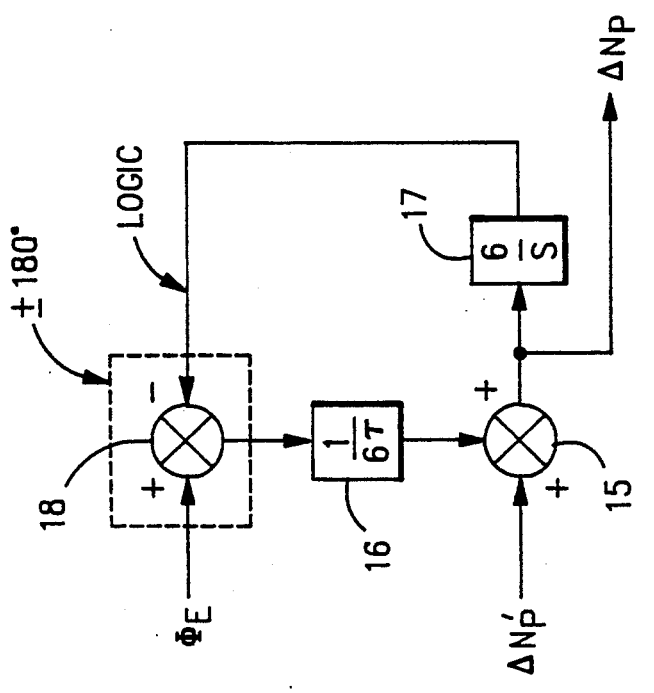
FIG. 6 shows the estimator for the difference in propeller speed.

The estimator used to generate the corrected difference in propeller speeds, $\Delta N_P$ is shown in FIG. 6. In FIG. 6 the input $\Delta N'_P$ is the high frequency input, and $\phi_E$ is the low frequency input. Summing junction 15 has an input $\Delta N'_P$ and a second input from the output of block 16. The output of summing junction 15 is the corrected difference in speed, $\Delta N_P$ and an input is also provided to the integrator 17 which has an output fed to a summing junction 18. The numerator of the integrator 17 is 6, which is a conversion of 6° per second per revolution per minute. The summing junction 18 also has as an input the phase error, $\phi_E$. As noted on FIG. 6, $\pm 180°$ logic must be applied both in calculating the output of summing junction 18 and also in calculating the output of integrator 17. This is required since these outputs represent phase angle values and must be limited to the $\pm 180°$ range. The $\pm 180°$ logic algorithm shown above for $\phi_E$ would apply as well to the two outputs of FIG. 6 which must be similarly limited to $\pm 180°$. The output of summing junction 18 is then sent to block 16 where it is scaled by the conversion factor six and an appropriate time constant TAU.

The estimator eliminates steady-state error due to the $\Delta N'_P$ input, such as where speed difference is zero and some other non-zero value is read. At low frequencies, the estimator utilizes $\phi_E$ for determining $\Delta N_P$.

Figure 7:
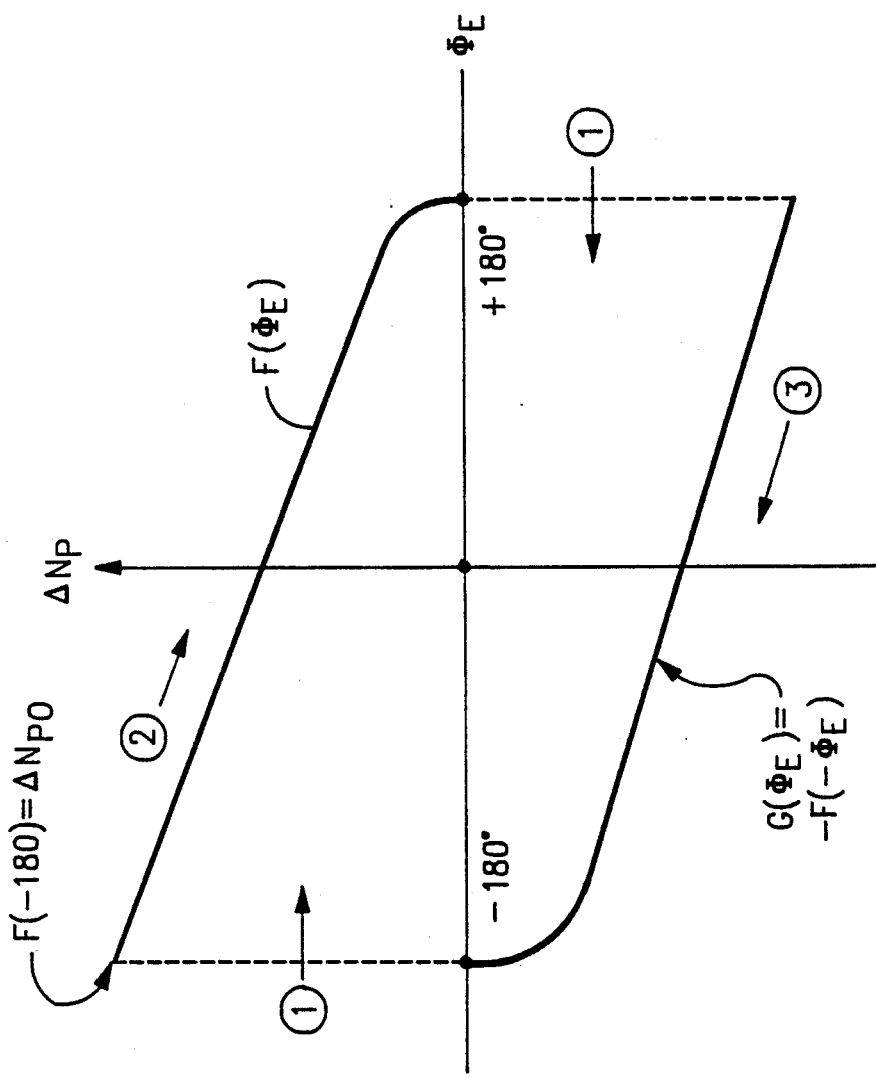
FIG. 7 shows a phase plane diagram of a trajectory in accordance with this invention.
Figure 8:
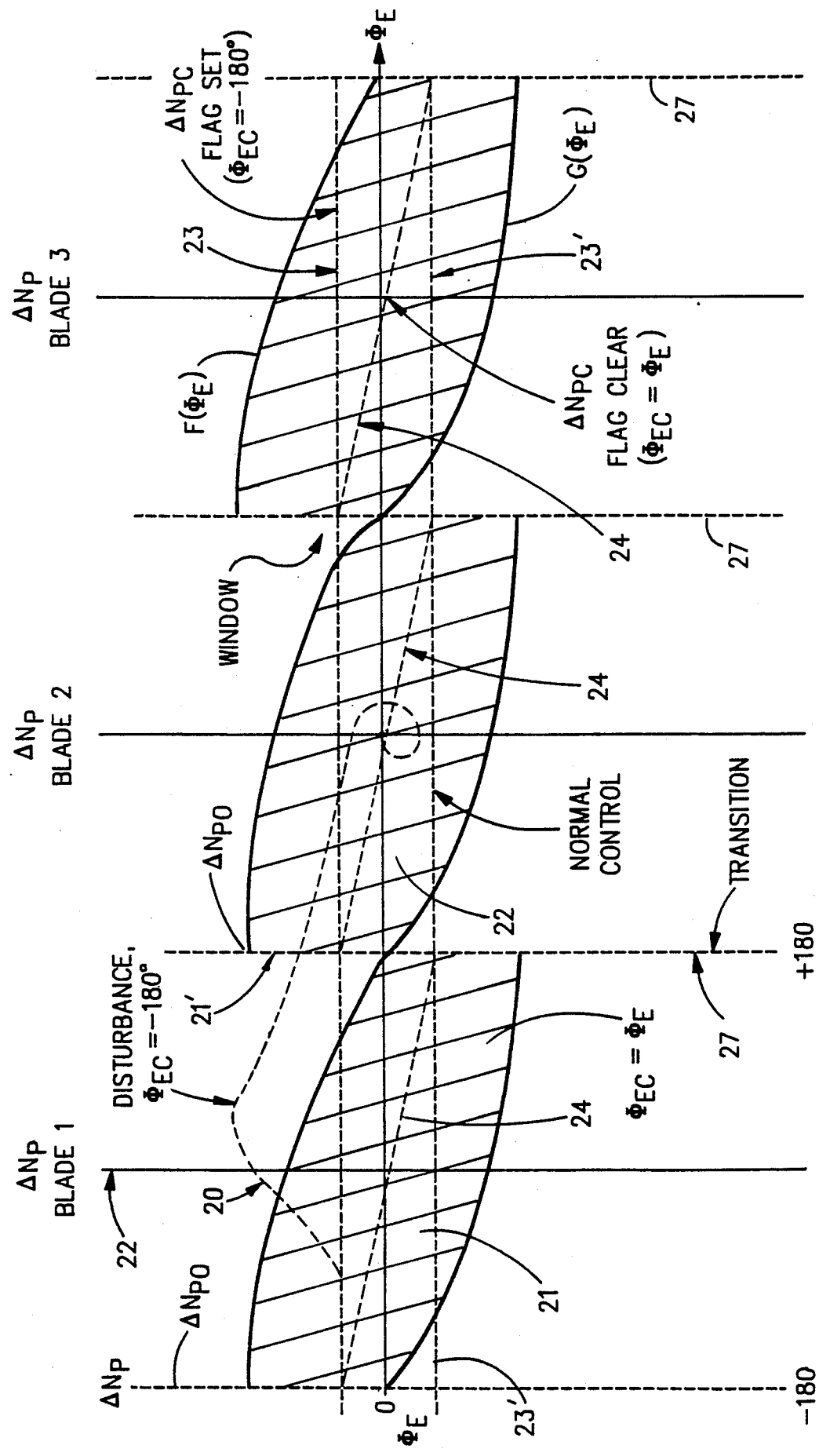
FIG. 8 shows a second phase plane diagram which includes a plurality of propeller blades.
Figure 9:
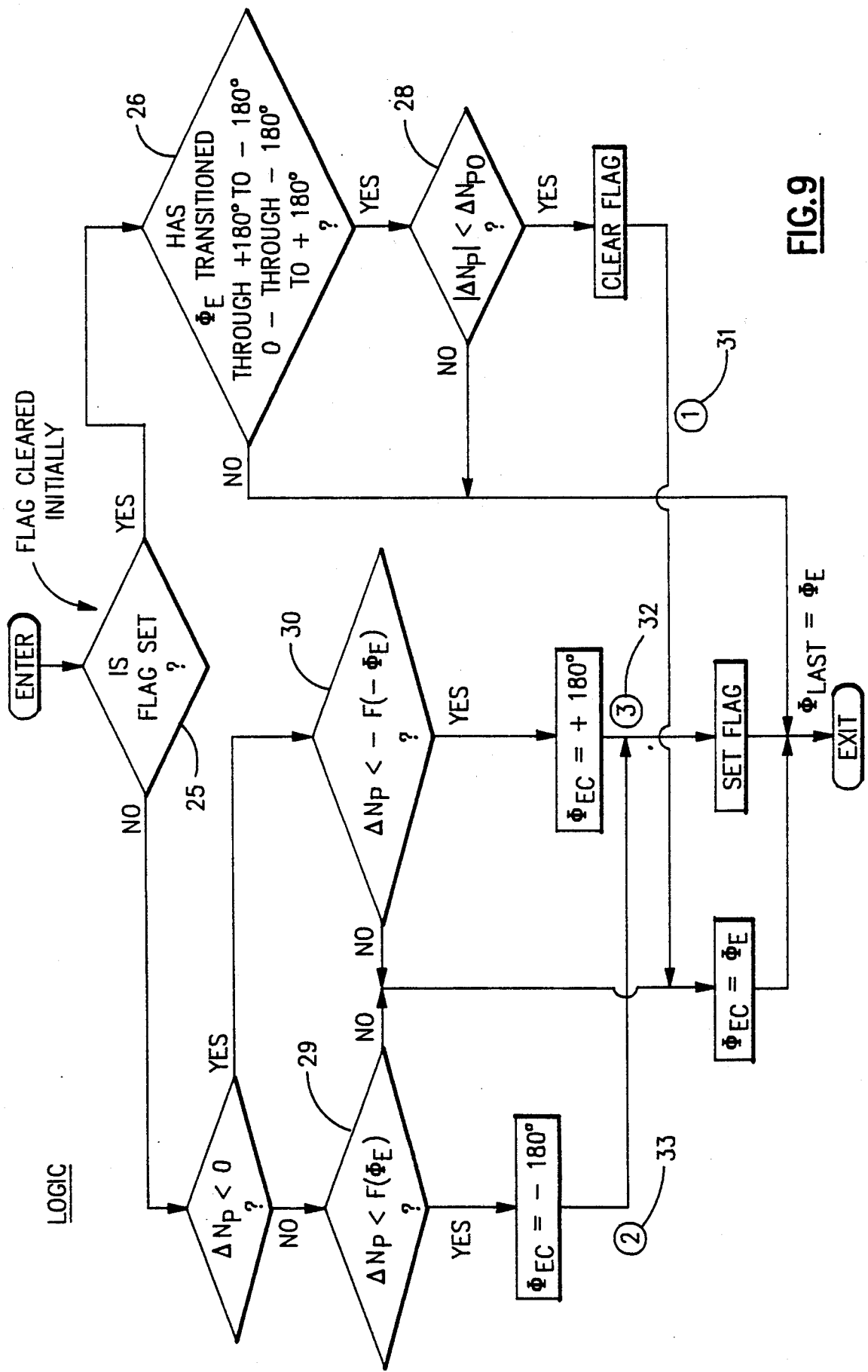
FIG. 9 shows the logic flow diagram used to generate the phase error for control ($\phi_{EC}$).

The logic at block 19 of FIG. 3 is shown in FIG. 9, and is explained by the phase plane diagrams of FIGS. 7 and 8. The term "phase plane" is defined on page 89 of "MODERN CONTROL PRINCIPLES AND APPLICATIONS" by Jay C. Hsu and Andrew U. Meyer, published by McGraw-Hill Book Company (1968).

Referring now to FIG. 7, there is shown a plot of phase error ($\phi_E$) and $\Delta N_P$, the corrected difference in propeller speeds. The curve in the positive half of $\Delta N_P$, $F(\phi_E)$ is a function of $\phi_E$ which may be determined by specifying the final conditions and then integrating the differential equations, which represent propeller synchronizer control, backwards in time. The curve $F(\phi_E)$ is the definition of the trajectory as used in this invention. The trajectory $F(\phi_E)$ defines the region for phase holding, i.e. where $\phi_{EC}$ equals $\phi_E$.

Also shown in FIG. 7 is $\Delta N_{P0}$ which is equal to $F(-180°)$. The value of $\Delta N_{P0}$ is thus defined as the value of $F(\phi_E)$ when $\phi_E = -180°$. $\Delta N_{P0}$ defines the value of the highest $\Delta N_P$ which will permit entry to the region of normal blade control or synchronizer of the blade for which control is established. In FIG. 7, this condition is indicated by the circled 1 at the left side of the phase plane diagram. Similarly, if the speed difference $\Delta N_P$ is negative, then another trajectory $G(\phi_E)$ which equals $-F(-\phi_E)$ is utilized. In this second instance, the value of $\Delta N_P$ is negative which shows an opposite direction of relative movement between the master and slave propellers. The function $G(\phi_E)$ also defines a window at the lower right side of FIG. 7 which will receive or capture into the normal control region any negative value of $\Delta N_P$ which is greater than that defined by minus $\Delta N_{P0}$ at $\pm 180°$.

In FIGS. 7 and 8, the shape of the curves $F(\phi_E)$ and $G(\phi_E)$ have been arbitrarily selected for purposes of illustration. For this reason, they are shown as straight lines except in the region of $\pm 180°$.

If a condition exists such that the value of $\Delta N_P$ lies outside the trajectory, $F(\phi_E)$, the value of $\Delta N_P$ will remain higher than the trajectory curve and remain so until it can enter a window at a subsequent blade.

Referring now to FIG. 8 which shows the phase plane diagram for a plurality of blades. Curve 20 shows the effect of a disturbance on the propeller synchronized operation. Curve 20 initially exits the normal control region (region 21) of blade 1. The curve 20 first exits the normal control region 21 and then $\phi_{EC}$, the phase error for control becomes set to $-180°$, thus driving the control at the maximum rate toward the desired correction. Next, curve 20 at the time it crosses the $\pm 180°$ line for blade 1 (also the $-180°$ line for blade 2) has a value which is less than $\Delta N_{P0}$. In this instance, the disturbance has caused the region of normal control or phase control to slip from propeller blade 1 to propeller blade 2. After entering the region of normal control 22 of blade 2, the disturbance settles out at the point where phase error equals zero and $\Delta N_P$ is equal to zero.

FIG. 8 also shows a horizontal line 23 which intersects the region of normal control for blades 1, 2 and 3, see reference 23. This is the line which is established by $\Delta N_{PC}$, defined by FIG. 10a, where the flag is set as shown on FIG. 9. The line 23 is established where $\phi_{EC}$ equals $-180°$.

In the case where $\Delta N_{PC}$ is established by the flag clear as illustrated on FIG. 9, $\phi_{EC}$ becomes equal to $\phi_E$.

Figure 10A:
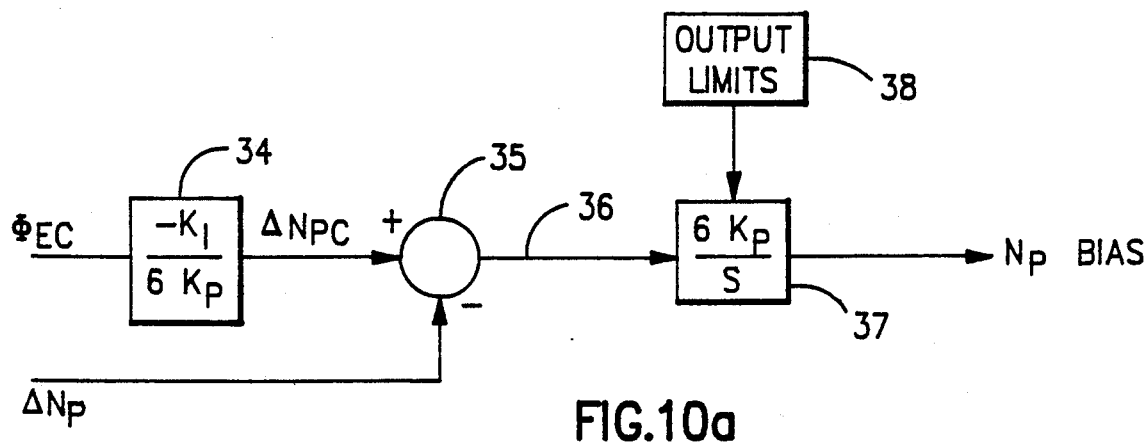
FIG. 10b shows a prior art propeller synchronizer and FIGS. 10a and 10c two possible synchronizer output configurations for this invention.

In this instance, the slope of the line 24 is determined by the value of $$\frac{-K_I}{6 K_P}$$

see reference 34, FIG. 10a. $\Delta N_{PC}$ is the commanded difference in propeller speed used for control. Referring now back to FIGS. 3 and 5, the term $\Delta N_P$ is the estimator output of speed difference which has been corrected for any steady-state measurement errors.

There is also shown in FIG. 8 a second horizontal line 23' which is the value of $\Delta N_{PC}$ when the flag is set at $\phi_{EC}$ equals $-180°$.

Referring now to FIG. 9, where the logic flow diagram for the logic 19, FIG. 3 is shown in detail. At block 25, it is determined if the flag has been set. If the flag is set, control then passes to block 26 where it is determined whether there has been a transition through $+180°$ to $-180°$, or through $-180°$ to $+180°$. This transition is illustrated in FIG. 8 by the dashed lines which appear between each blade. The transition line is shown as 27.

The determination of whether $\phi_E$ has transitioned from $+180°$ to minus $180°$ is accomplished by comparison of the current value of $\phi_E$ with the previous value of $\phi_E$, the assumption of a normal maximum amount of difference, and the conclusion that there has been a transition when the magnitude of the difference is abnormally high.

Referring now back to FIG. 9, block 28 provides for a comparison of the absolute value of $\Delta N_P$ with the constant value of $\Delta N_{P0}$. If the answer is yes, this means that the absolute value of $\Delta N_P$ is less than $\Delta N_{P0}$, and that the propeller synchronizer can enter normal control as the $\phi_E$ passes through the window as indicated in FIG. 8 at window 21' and by disturbance line 20. Under these conditions, a clear flag requires setting of $\phi_{EC}$ equal to $\phi_E$ which is the flag clear signal 24 depicted on FIG. 8.

Referring now to the left-hand side of FIG. 9, there is shown at blocks 29 and 30 the logic which relates to the trajectory established by the functions $F(\phi_E)$ and $-F(-\phi_E)$ At block 29, if $\Delta N_P$ is not greater than $F(\phi_E)$, this means that the value of $\Delta N_P$ lies below the trajectory line on the top half of FIG. 7 or the trajectory lines on the top half of FIG. 8. By this decision, it is determined that the propeller speed difference $\Delta N_P$ is within the boundary set by $F(\phi_E)$ and therefore is within the area of normal control.

Decision block 30 likewise performs the same function for negative values of $\Delta N_P$, where such values are below the $\phi_E$ axis as depicted in FIG. 8.

Referring now to block 29 of FIG. 9, if it is determined that $\Delta N_P$ is greater than $F(\phi_E)$, then $\phi_{EC}$ is set equal to $-180°$. This merely means that the value of $\Delta N_P$ falls outside the trajectory established by $F(\phi_E)$ and that a constant value of $-180°$ for the value of $\phi_{EC}$ shall be used. Similarly, as can be seen in reference block 30, $\phi_{EC}$ is $+180°$ is used to correct in the opposite direction.

In FIG. 9 there is shown a circled 1 at reference 31 on the line connecting clear flag to $\phi_{EC}$ equals $\phi_E$. This reference numeral corresponds to the circled 1 at the right and at the left of the phase plot shown in FIG. 7. The clear flag decision is made in response to the determination that there has been a transition and that the magnitude of $\Delta N_P$ is less than $\Delta N_{P0}$ as shown in FIG. 7.

Also, as entry is made into the region of control, $\phi_{EC}$ is equated to $\phi_E$ so that $\phi_E$ controls the propeller synchronizer output and allows the disturbance (such as shown in curve 20 FIG. 8 to enter the region of stability and to settle down at the point where $\phi_E$ equals zero. This region of control is also described as the stability region, i.e. the area where the SYNCHROPHASER can lock onto a particular blade, and gain control of the blade synchronization so that $\phi_E$ can settle out at zero.

At FIG. 10A there is shown a propeller synchronizer output control which has an input $\phi_{EC}$ and $\Delta N_P$.

The apparatus of FIG. 10A shows multiplication of $\phi_{EC}$ by a constant gain factor 34 which has as an output $\Delta N_{PC}$. The constant 34 is comprised of by the integration constant $K_I$ and the proportional constant $K_P$. At summing junction 35, speed error is determined by the difference of $\Delta N_{PC}$ and $\Delta N_P$. Speed error on line 36 is integrated at block 37 and limited by output limits 38. The output $N_P$ bias is therefore the output to the propeller speed control. FIG. 10A represents an embodiment of the invention which has been used herein for illustrative purposes.

Figure 10B:
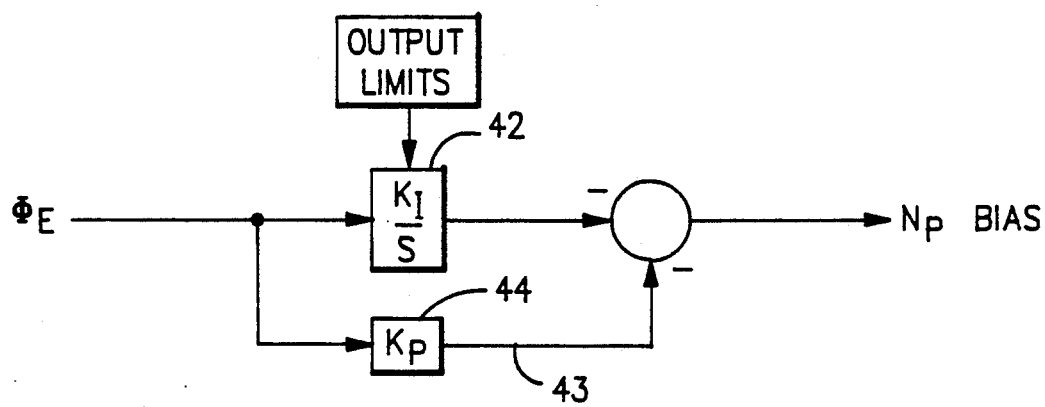
Figure 10C:
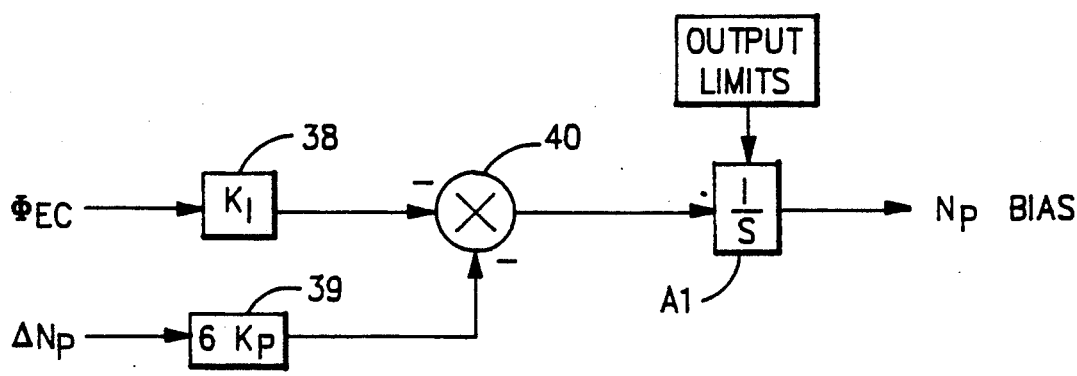

In FIG. 10C there is shown another embodiment where $\phi_{EC}$ term is multiplied by a constant $K_I$, the integration constant at block 38 and where $\Delta N_P$ is multiplied by a constant six times $K_P$ which is shown at block 39. These two terms are summed at summing junction 40 and fed to integrator 41 to produce $N_P$ bias. FIG. 10C represents the preferred embodiment of the invention.

FIG. 10B shows a conventional propeller synchronizer of the prior art where the only input is $\phi_E$. Integrator 42 has an output which is summed with a proportional output 43 from block 44. The output is once again N bias. Since the output $N_p$ bias is directly proportional to $\phi_E$ by $K_p$ of block 44, the output $N_p$ bias can exhibit objectionably large step transients due to the numerical discontinuity of the $\phi_E$ signal.

Although the invention has been shown and described with respect to a best mode embodiment thereof, it should be understood by those skilled in the art that the foregoing and various other changes, omissions and deletions in the form and detail thereof may be made therein without departing from the spirit and scope of this invention.

I claim:

1. Apparatus for controlling the relative phase difference between a designated master propeller and each slave propeller of a multi-engine aircraft, each propeller having blade pitch control to vary each propeller's blade angle to regulate actual propeller speed in a manner to reduce a phase difference between a blade of the master propeller and a blade of each of the slave propellers, comprising:

sensor means, one for each engine, for providing a signal pulse in response to rotation of each propeller blade past a reference point;

signal processing means, responsive to said signal pulses from each said sensor means, and having memory means for storing signals including program signals defining an executable algorithm for calculating individual phase error signals, each representative of the difference angular displacement between a reference phase value and the actual angular displacement in a blade position between the master propeller and each slave propeller, and for calculating individual speed error signals, each representative of said speed difference signal compensated by said phase error signal;

signal summing means, for summing each said individual phase error signal with each related said individual speed error signal to produce a speed bias signal to adjust each slave propeller's blade pitch angle in a manner to reduce the magnitude of each said phase error signal;

as characterized by:

limit means, responsive to each of said individual speed error signals for limiting said speed bias signal when said individual speed error signal exceeds a stability range between a positive trajectory function and a negative trajectory function; and said memory means further includes program signals defining said positive trajectory function and said negative trajectory function.

2. Apparatus according to claim 1 wherein said individual phase error signal has a maximum value of ±180 degrees divided the number of propeller blades on the propeller.

3. Apparatus according to claim 1 wherein said speed bias signal is indicative of a predetermined linear function within said stability range.

4. Apparatus according to claim 1 wherein said positive trajectory function and said negative trajectory function each have a function indicative of a rate of change of the difference between said reference phase value and a predetermined phase difference.

5. Apparatus according to claim 1 wherein said stability range exist for each blade on each slave propeller.

* * * * *

UNITED STATES PATENT AND TRADEMARK OFFICE
CERTIFICATE OF CORRECTION

PATENT NO. : 5,042,965
DATED : August 27, 1991
INVENTOR(S) : Frank R. Niessen

It is certified that error appears in the above-identified patent and that said Letters Patent is hereby corrected as shown below:

On title page, item [54], and col. 1, line 1, "SYNCHROPHASER" should be
--SYNCHROPHASER®--

Column 2, line 22 before "some" insert --utilize--
Column 4, line 23 "synchronizer" should be --synchronizing--
Column 4, line 35 "±180°" should be --+180°--
Column 4, line 46-47 "synchronized" should be
--synchronizer--
Column 4, line 53 "±180°" should be --+180°--
Column 6, line 9 "SYNCHROPHASER" should be --propeller synchronizer--
Column 6, line 37 "N" should be --$N_p$--

Signed and Sealed this

Thirtieth Day of March, 1993

*Attest:*

STEPHEN G. KUNIN

*Attesting Officer*      *Acting Commissioner of Patents and Trademarks*